US010427635B2

(12) United States Patent
Alequin et al.

(10) Patent No.: US 10,427,635 B2
(45) Date of Patent: Oct. 1, 2019

(54) APPARATUS AND METHOD FOR ADJUSTING FRONT PASSENGER SEAT

(71) Applicant: Honda Motor Co., Ltd., Tokyo (JP)

(72) Inventors: Joseph Anthony Alequin, Los Angeles, CA (US); Stuart Masakazu Yamamoto, La Mirada, CA (US); Junlei Zhang, Long Beach, CA (US); Evan Sullivan, Culver City, CA (US)

(73) Assignee: Honda Motor Co., Ltd., Tokyo (JP)

( * ) Notice: Subject to any disclaimer, the term of this patent is extended or adjusted under 35 U.S.C. 154(b) by 99 days.

(21) Appl. No.: 15/631,539

(22) Filed: Jun. 23, 2017

(65) Prior Publication Data

US 2018/0370476 A1 Dec. 27, 2018

(51) Int. Cl.
| | |
|---|---|
| *B60R 21/015* | (2006.01) |
| *G01S 15/04* | (2006.01) |
| *G01S 15/42* | (2006.01) |
| *B60R 16/037* | (2006.01) |
| *B60N 2/00* | (2006.01) |
| *B60R 21/00* | (2006.01) |
| *G06K 9/00* | (2006.01) |

(52) U.S. Cl.
CPC ......... *B60R 21/01554* (2014.10); *B60N 2/00* (2013.01); *B60R 16/037* (2013.01); *B60R 21/015* (2013.01); *G01S 15/04* (2013.01); *G01S 15/42* (2013.01); *B60R 21/00* (2013.01); *G06K 9/00* (2013.01)

(58) Field of Classification Search
CPC ........ B60R 21/015; G01S 15/04; G01S 15/42
USPC .......................................................... 701/49
See application file for complete search history.

(56) References Cited

U.S. PATENT DOCUMENTS

| | | | |
|---|---|---|---|
| 4,907,153 A | 3/1990 | Brodsky | |
| 5,197,007 A | 3/1993 | Parker | |
| 6,282,475 B1 | 8/2001 | Washington | |
| 7,575,206 B2 | 8/2009 | Meier et al. | |
| 8,260,506 B2 | 9/2012 | Jungert et al. | |
| 8,527,146 B1 * | 9/2013 | Jackson ............ | B60W 50/0098 180/273 |
| 8,678,463 B2 | 3/2014 | Willey | |

* cited by examiner

*Primary Examiner* — Maceeh Anwari
(74) *Attorney, Agent, or Firm* — Honda Patents & Technologies North America, LLC; Mark E. Duell

(57) ABSTRACT

A method and apparatus for adjusting a front passenger seat in a motor vehicle includes the steps of identifying a user identification apparatus proximate to the motor vehicle, and accessing a user profile associated with the user identification apparatus. The user profile includes a predetermined home position for the front passenger seat. If the front passenger seat is unoccupied, the position of the front passenger seat is adjusted to the predetermined home position.

20 Claims, 5 Drawing Sheets

APPARATUS AND METHOD FOR ADJUSTING FRONT PASSENGER SEAT

TECHNICAL FIELD

The embodiments disclosed herein relate to the field of passenger seats for a motor vehicle.

BACKGROUND

It has been known to provide a system that includes the memory settings of a driver's seat. When the driver's seat is checked and adjusted for a specific profile, the position of the front passenger seat may be in a position uncomfortable for the driver to place something on the seat, or it may be in a position where the seat back obstructs the view of the driver. Therefore, there is a need for a method and apparatus to adjust the position of the front passenger seat to a predetermined home or memory position.

APPLICATION SUMMARY

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

According to one aspect, a method for adjusting a front passenger seat in a motor vehicle includes the steps of identifying a user identification apparatus proximate to the motor vehicle, accessing a user profile associated with the user identification apparatus, the user profile including a predetermined home position for the front passenger seat, determining whether the front passenger seat is occupied, and adjusting a position of the front passenger seat to the predetermined home position if the front passenger seat is not occupied.

According to another aspect, a front passenger seat assembly of a motor vehicle includes a front passenger seat, which includes a seat cushion disposed in a relatively horizontal alignment, wherein the seat cushion is moveable in at least one direction, and a seat back rotatable about a first axis proximate a rear portion of the seat portion, an electronic control unit for storing a user profile, and a memory seat module controlled by the electronic control unit and configured to control movement of the seat cushion and the seat back to a predetermined positioned based upon the user profile.

According to yet another aspect, a front passenger seat assembly of a motor vehicle includes a front passenger seat that includes a seat cushion disposed in a relatively horizontal alignment, wherein the seat cushion is moveable in longitudinally forward and rearward direction and transversely in an upward and downward direction, a seat back rotatable about a first axis proximate a rear portion of the seat portion, and a sensor disposed in the motor vehicle for detecting a passenger in the front passenger seat, an electronic control unit for storing a user profile, a user identification apparatus, the user identification apparatus including indicia for identifying the user identification apparatus, a detector in electrical communication with the electronic control unit, the detector configured to detect the indicia associated with the user identification apparatus, a memory seat module controlled by the electronic control unit and configured to control movement of the seat cushion and the seat back to a predetermined home position saved by a vehicle user in the user profile associated with the user identification apparatus; and wherein the electronic control unit prevents the memory seat module from automatically moving the seat cushion and the seat back if the sensor detects a passenger in the front passenger seat.

The figures depict various embodiments for purposes of illustration only. One skilled in the art will readily recognize from the following discussion that alternative embodiments of the structures and methods illustrated herein may be employed without departing from the principles of the embodiments described herein.

DETAILED DESCRIPTION

Figure 1:
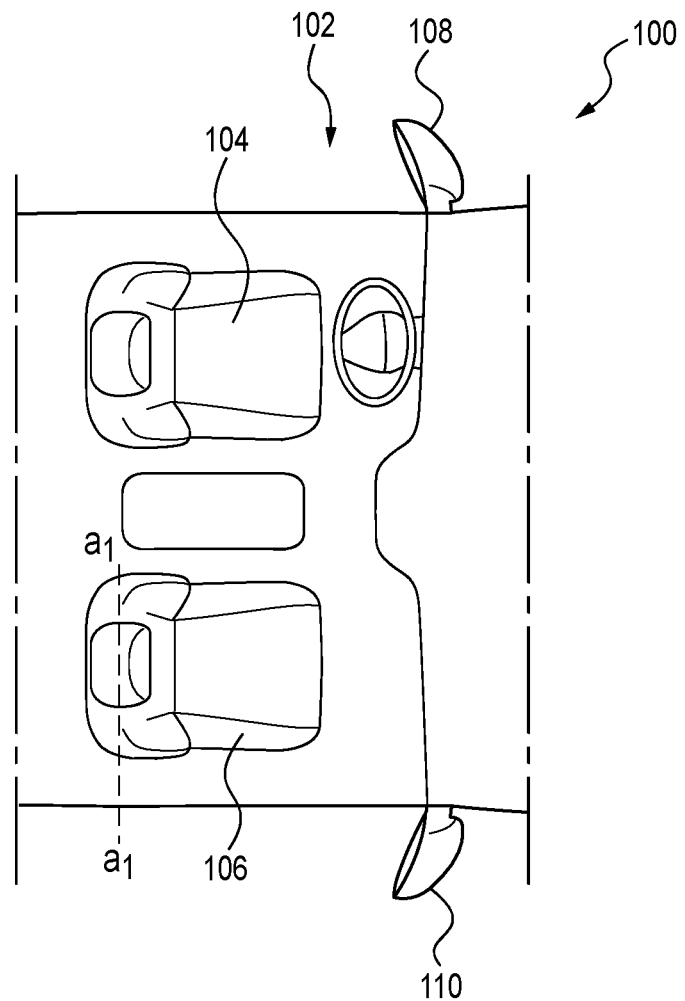
FIG. 1 is a partial top view of a motor vehicle illustrating the arrangement of a front seat assembly.
Figure 2:
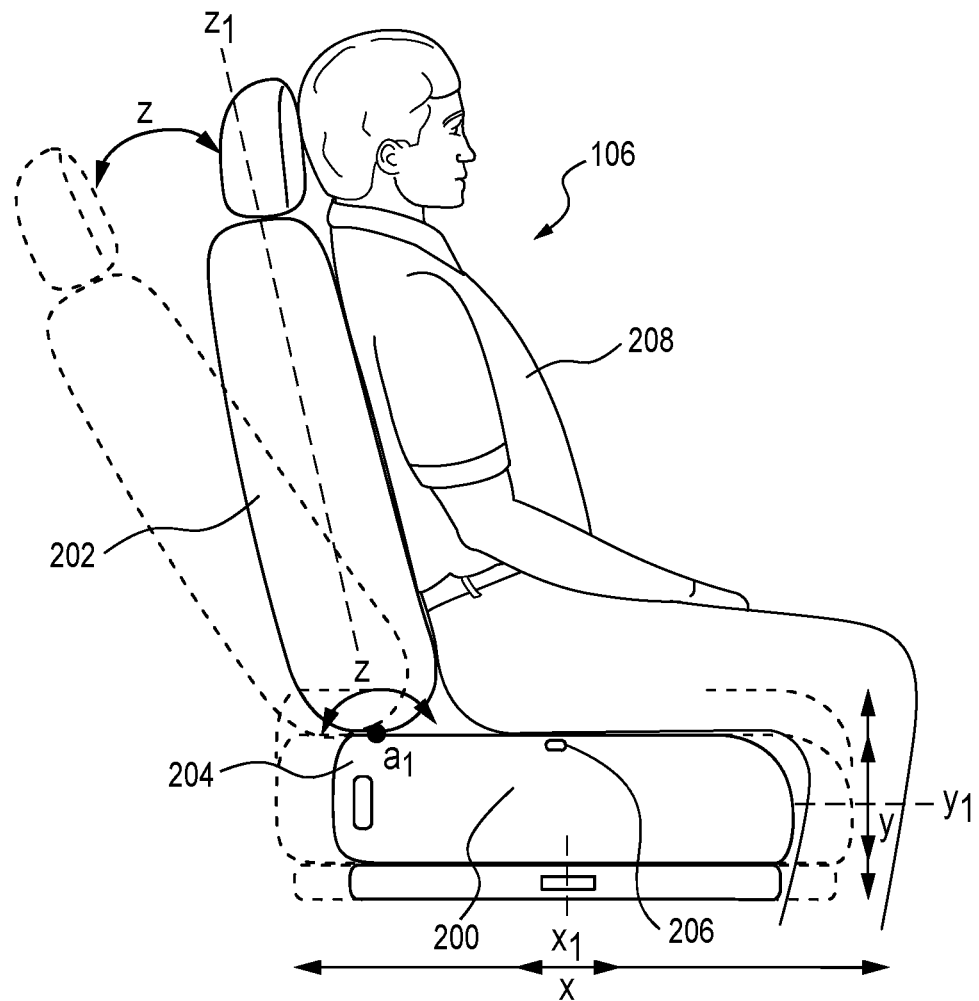
FIG. 2 is a side view of a front passenger seat of the front seat assembly of FIG. 1.

FIG. 1 illustrates a top view of a front seat assembly 102 of a motor vehicle 100. The front seat assembly 102 includes a driver seat 104 and a front passenger seat 106. The vehicle 100 also includes mirrors 108 and 110. FIG. 2 illustrates a side view of the front passenger seat 106, which includes a seat cushion 200 disposed in a relatively horizontal alignment, which is moveable in longitudinally forward and rearward direction x and transversely in an upward and downward direction y. The front passenger seat 106 also includes a seat back 202 rotatable in the z direction about a first axis a1 proximate a rear portion 204 of the seat cushion 200 for a position of the seat back 202. The front passenger seat 106 may also include a sensor 206 disposed in the seat cushion 200 for detecting a passenger 208 in the front passenger seat 106. The sensor 206 may be a pressure sensor, a sensor that is part of an occupant classification system, or any other type of sensor known to those skilled in the art. In place of a sensor 206 disposed within the front passenger seat 106, other types of sensors, such as occupancy sensors, optical sensors or cameras, and the like may also be used to detect the presence or absence of the passenger 208.

Figure 3:
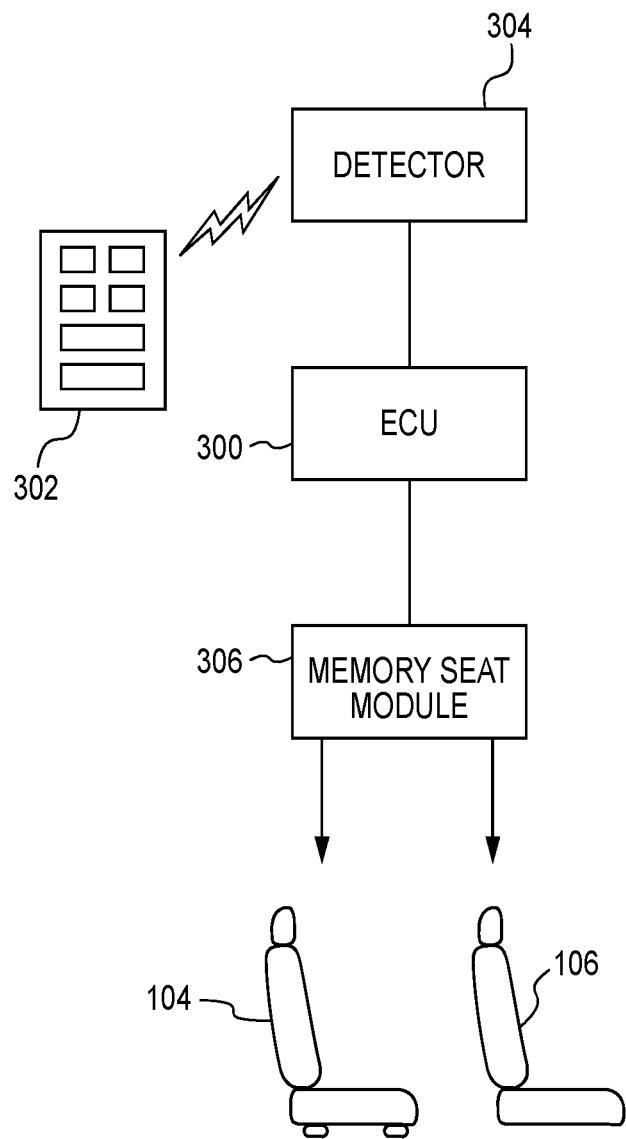
FIG. 3 is a schematic view of an apparatus for moving the front passenger seat to a predetermined home position.

As illustrated schematically in FIG. 3, the front seat assembly 102 further includes an electronic control unit ("ECU") 300 for storing a user profile associated with a user identification apparatus, such as key fob 302 as illustrated in FIG. 3. While the embodiments discussed herein are described with respect to key fob 302, it should understood that any other type of user identification apparatus such as a biometrics identification apparatus, an application-enabled personal mobile device or telephone, or any other user identification apparatus known to those skilled in the art may be used. Typically, the motor vehicle 100 may come with more than one key fob 302, and the ECU 300 may store separate user profiles, one each associated with each key fob 302. The key fob 302 may include indicia for the identifying the key fob 302 that is detectable by a detector 304, such as an RF transceiver, a Bluetooth® enabled receiver, a wired receiver, a cellular or wireless data receiver, or any other suitable method of electrical communication, in the motor vehicle 100. The detector 304 is further in electrical communication with the ECU 300, and when one of the key fobs 302 is detected, a signal is sent from the detector 304 to the ECU 300 with the indicia allowing the specific key fob 302 to be identified. The ECU 300 may further then apply the user profile to the settings in the motor vehicle 100. The user profile may include driver seat settings, mirror settings, radio or in-vehicle entertainment preferences, and the like.

In addition to the items previously discussed, the user profile may further include a predetermined preferred home position for the front passenger seat 106. As illustrated in FIG. 2, the predetermined home position includes a preferred longitudinal position $x_1$ of the seat cushion 200 of the front passenger seat 106 and the preferred height $y_1$ of the seat cushion 200. Additionally, the predetermined home position includes the preferred rotatable position $z_1$ of the seat back 202 of the front passenger seat 106. As illustrated in FIG. 3, a memory seat module 306 in electrical connection with the ECU 300 is configured to control movement of the seat cushion 200 and the seat back 202 to the predetermined preferred home position $x_1$, $y_1$, $z_1$ based upon what is saved in the user profile. The memory seat module 306 may include electric motors and gears (not shown) to move the seat cushion 200 and seat back 202 in methods known to those skilled in the art. The predetermined preferred home position $x_1$, $y_1$, $z_1$ of the front passenger seat 106 may be selected and saved by an user of the motor vehicle 100, such as by the driver based upon a previously set position of the front passenger seat 106, or the predetermined preferred home position $x_1$, $y_1$, $z_1$ may be set by the passenger 208 of the motor vehicle 100, particularly when the passenger 208 is a frequent passenger in the motor vehicle 100 with the driver. The predetermined preferred home position $x_1$, $y_1$, $z_1$ may be set by actuating a button (not shown) in electrical communication with memory seat module 306 in the motor vehicle 100 of the type known to those skilled in the art, or the predetermined preferred home position $x_1$, $y_1$, $z_1$ may be established and saved when the ignition of the motor vehicle 100 is disengaged.

The ECU 300 may further be programmed such that the memory seat module 306 is prevented from automatic movement of the seat cushion 200 and the seat back 202 if the sensor 206 detects a passenger 208 in the front passenger seat 106. Further, while the ECU 300 may move the front driver seat 104, the side mirrors 108, 110, and call up any further in-vehicle personalizations upon detection of a key fob 302 with a stored profile, a delay may be instituted that the ECU 300 will not direct the memory seat module 306 to move the front passenger seat 106 until a set condition is achieved. That set condition may be a fixed-time delay, completion of a system self-check, or actuation of the motor vehicle ignition. Delaying movement of the front passenger seat 106 may prevent an inconvenience to a passenger 208 of the motor vehicle 100.

Figure 4:
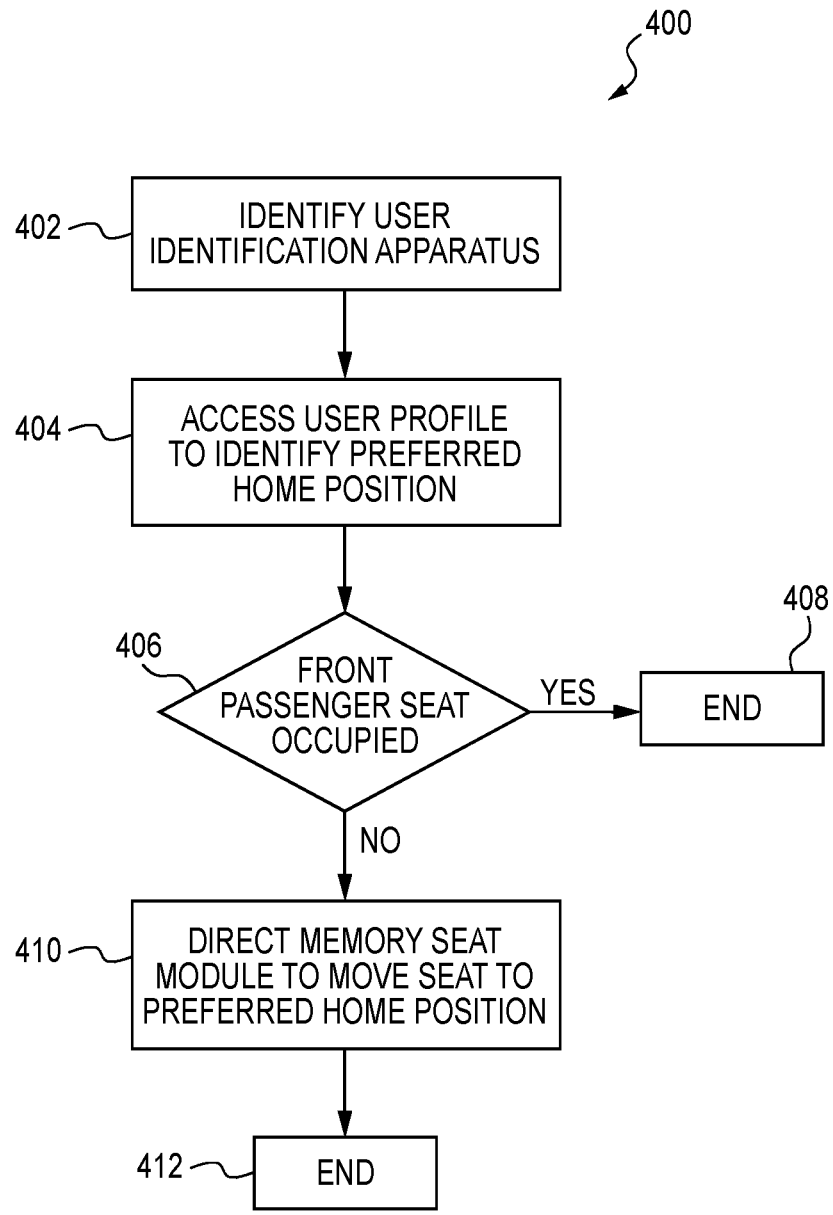
FIG. 4 is a flowchart illustrating one embodiment of a method of adjusting the position of the front passenger seat to the predetermined home position.

FIG. 4 illustrates one embodiment of a method 400 for adjusting the front passenger seat 106 of the motor vehicle 100. The first step 402 is identifying a user identification apparatus, such as key fob 302, proximate to the motor vehicle 100, such as by identifying a code associated with the key fob 302 by a detector 304 like an RF transceiver in the motor vehicle 100, or by any other suitable method known to one skilled in the art.

The second step 404 is accessing a user profile stored within the ECU 300 of the motor vehicle 100 that is associated with the key fob 302. The user profile may include a plurality of settings related to the position of mirrors 108, 110, a preferred and predetermined home position for the driver's seat 104, predetermined setting related to audio settings, heating and air conditioning settings, and a predetermined home position $x_1$, $y_1$, $z_1$ for the front passenger seat 106.

The third step 406 is to determine whether the front passenger seat 106 is occupied such as with the sensor 206 in seat cushion 200 of the front passenger seat 106 that may be shared by a seat belt detection system in the motor vehicle 100. If the front passenger seat 106 is occupied, the method ends 408 and the front passenger seat 106 is not moved. If the front passenger seat 106 is determined to be unoccupied, the fourth step 410 is using a memory seat module 306 to operate the motors and gears to adjust the position of the front passenger seat 106 to the predetermined home position $x_1$, $y_1$, $z_1$. Upon completion of the moving of the front passenger seat, 106, the method 400 ends 412.

Figure 5:
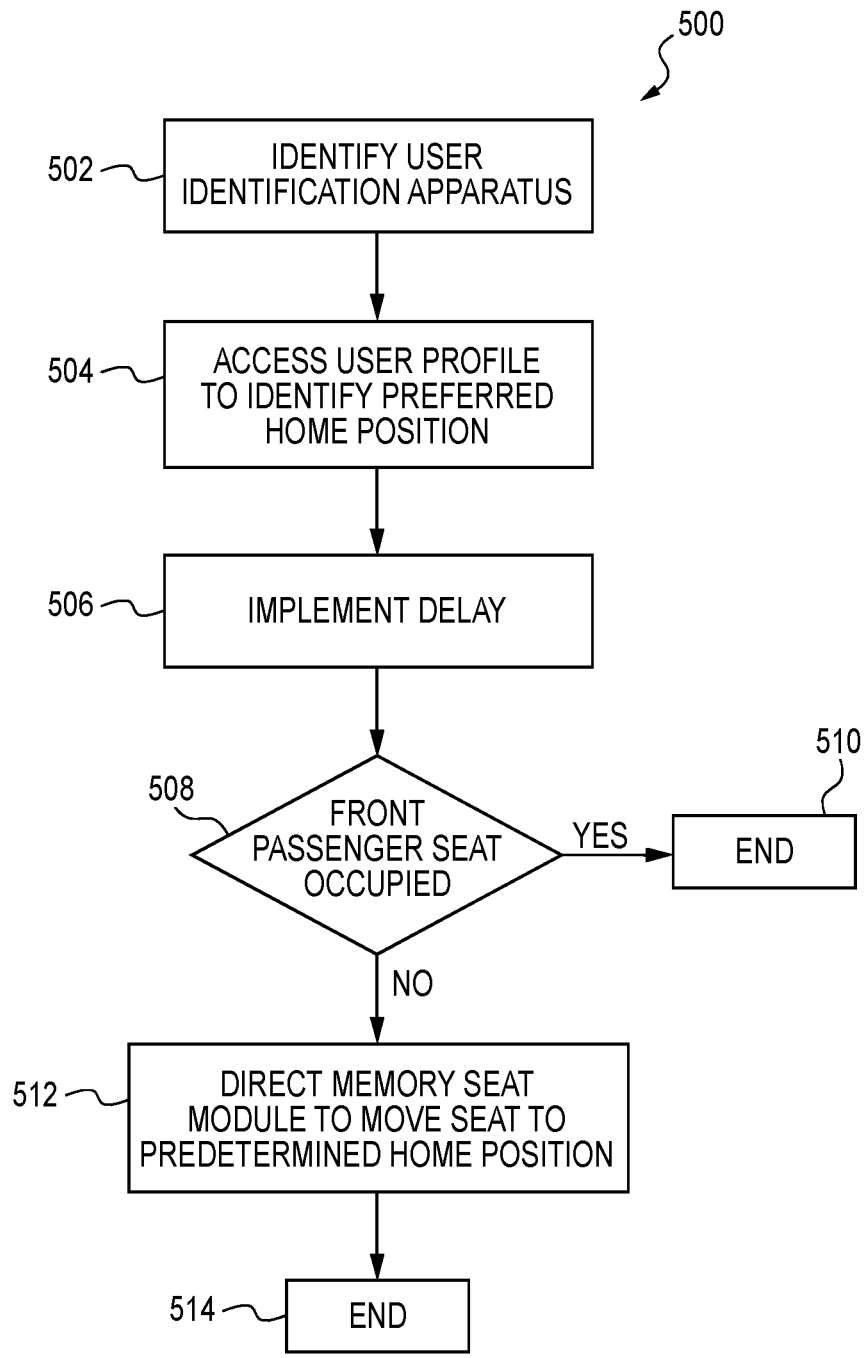
FIG. 5 is a flowchart illustrating a second embodiment of a method of adjusting the position of the front passenger seat to the predetermined home position.

FIG. 5 illustrates an additional embodiment of the method 500 of adjusting the front passenger seat 106 of the motor vehicle 100. The first step 502 is identifying a user identification apparatus, such as key fob 302 proximate to the motor vehicle 100, by identifying a code associated with the key fob 302 by a detector 304 such as an RF transceiver in the motor vehicle 100, or by any other suitable method known to one skilled in the art.

The second step 504 is accessing a user profile stored within the ECU 300 of the motor vehicle 100 that is associated with the key fob 302 or any other user identification apparatus. The user profile may include a plurality of settings related to the position of mirrors 108, 110, a preferred and predetermined home position for the driver's seat 104, predetermined setting related to audio settings, heating and air conditioning settings, and a predetermined home position $x_1$, $y_1$, $z_1$ for the front passenger seat 106.

The third step 506 is to implement a delay for a predetermined amount of time. The delay may be implemented to ensure that the front passenger seat 106 is not moved in the event that the front passenger seat 106 is to become occupied. The predetermined amount of time may be equal to the amount of time to perform a pre-specified system check in the motor vehicle 100, may be for a fixed number of seconds, or to implement a delay until the ignition of the motor vehicle 100 is engaged by the driver to start the motor vehicle 100.

The fourth step 508 is to determine whether the front passenger seat 106 is occupied such as with the sensor 206 in seat cushion 200 of the front passenger seat 106 that may be shared by the seat belt detection system in the vehicle. If the front passenger seat 106 is occupied, the method ends 510 and the front passenger seat 106 is not moved. If the front passenger seat 106 is determined to be unoccupied, the fifth step 512 is using a memory seat module 306 to operate the motors and gears to adjust the position of the front passenger seat 106 to the predetermined home position $x_1$, $y_1$, $z_1$. Upon completion of the moving of the front passenger seat, 106, the method 500 ends 514.

In the event that the front passenger seat 106 becomes occupied, as detected by the sensor 206 in the seat cushion 200, as the front passenger seat 106 is being moved to the predetermined home position $x_1$, $y_1$, $z_1$, the adjustment of the front passenger seat 106 stops.

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

In addition, the language used in the specification has been principally selected for readability and instructional purposes, and may not have been selected to delineate or circumscribe the inventive subject matter. Accordingly, the disclosure of the embodiments is intended to be illustrative, but not limiting, of the scope of the embodiments, which is set forth in the claims.

While particular embodiments and applications have been illustrated and described herein, it is to be understood that the embodiments are not limited to the precise construction and components disclosed herein and that various modifications, changes, and variations may be made in the arrangement, operation, and details of the methods and apparatuses of the embodiments without departing from the spirit and scope of the embodiments as defined in the appended claims.

What is claimed is:

1. A method for adjusting a front passenger seat in a motor vehicle, comprising the steps of:
    identifying a user identification apparatus proximate to the motor vehicle;
    accessing a user profile associated with the user identification apparatus, the user profile including a predetermined home position for the front passenger seat;
    determining whether the front passenger seat is occupied; and
    adjusting a position of the front passenger seat to the predetermined home position if the front passenger seat is not occupied.

2. The method of claim 1, prior to the step of determining whether the front passenger seat is occupied, further comprising the step of:
    implementing a delay for a predetermined amount of time.

3. The method of claim 2 wherein the step of implementing a delay further comprises the step of:
    performing a pre-specified system check in the motor vehicle.

4. The method of claim 3 wherein the delay for the predetermined amount of time is approximately equal to an amount of time required to complete the pre-specified system check.

5. The method of claim 1, prior to the step of determining whether the front passenger seat is occupied, further comprising the step of:
    implementing a delay until an ignition of the motor vehicle is engaged.

6. The method of claim 1 further comprising the step of:
    stopping adjustment of the front passenger seat if the front seat becomes occupied.

7. The method of claim 1 wherein the predetermined home position of the front passenger seat comprises:
    a longitudinal position of a seat cushion of the front passenger seat;
    a height of the seat cushion of the front passenger seat; and
    a rotatable position of a seat back of the front passenger seat.

8. The method of claim 1 first comprising the step of:
    setting the predetermined home position for the front passenger seat.

9. The method of claim 8 wherein the step of setting predetermined home position of the front passenger seat further comprises the step of:
    storing the predetermined home position for the front passenger seat in the user profile.

10. A front passenger seat assembly of a motor vehicle, the motor vehicle including a driver seat on which a driver sits, comprising:
    a front passenger seat, comprising:
        a seat cushion disposed in a relatively horizontal alignment, wherein the seat cushion is moveable in at least one direction; and
        a seat back rotatable about a first axis proximate a rear portion of the seat portion;
    an ECU for storing a user profile of the driver; and
    a memory seat module controlled by the ECU and configured to control movement of the seat cushion and the seat back to a predetermined positioned based upon the user profile.

11. The front passenger seat assembly of claim 10 further comprises:
    a user identification apparatus, the user identification apparatus including indicia for identifying the user identification apparatus; and
    a detector in electrical communication with the ECU, the detector configured to detect the indicia associated with the user identification apparatus.

12. The front passenger seat assembly of claim 11 further comprises:
    a sensor disposed in the motor vehicle for detecting a passenger in the front passenger seat; and
    wherein the ECU prevents the memory seat module from moving the seat cushion and the seat back if the sensor detects a passenger in the front passenger seat.

13. The front passenger seat assembly of claim 12 wherein the ECU is configured to provide a delay for a predetermined amount of time in moving of the seat cushion and the seat back to the predetermined positioned based upon the user profile.

14. The front passenger seat assembly of claim 13 wherein the delay for the predetermined amount of time is approximately equal to an amount of time required to complete the pre-specified system check.

15. The front passenger seat assembly of claim 12 wherein the ECU is configured to provide a delay until an ignition of the motor vehicle is engaged.

16. The front passenger seat assembly of claim 15 wherein the predetermined home position for the front passenger seat is set by saving a position of the seat cushion and a position of the seat back when the ignition of the motor vehicle is disengaged.

17. The front passenger seat assembly of claim 10 wherein the predetermined home position for the front passenger seat is set by actuating a button in electrical communication with the memory seat module.

18. A front passenger seat assembly of a motor vehicle, comprising:
    a front passenger seat, comprising:
        a seat cushion disposed in a relatively horizontal alignment, wherein the seat cushion is moveable in longitudinally forward and rearward direction and transversely in an upward and downward direction;
        a seat back rotatable about a first axis proximate a rear portion of the seat portion; and
        a sensor disposed in the motor vehicle for detecting a passenger in the front passenger seat;
    an electronic control unit for storing a user profile;

a user identification apparatus, the user identification apparatus including indicia for identifying the user identification apparatus;

a detector in electrical communication with the electronic control unit, the detector configured to detect the indicia associated with the user identification apparatus;

a memory seat module controlled by the electronic control unit and configured to control movement of the seat cushion and the seat back to a predetermined home position saved by a vehicle user in the user profile associated with the user identification apparatus; and wherein the electronic control unit prevents the memory seat module from automatically moving the seat cushion and the seat back if the sensor detects a passenger in the front passenger seat.

19. The front passenger seat assembly of claim 18 wherein the electronic control unit is configured to provide a delay for a predetermined amount of time in moving of the seat cushion and the seat back to the predetermined positioned based upon the user profile.

20. The front passenger seat assembly of claim 18 wherein the electronic control unit is configured to provide a delay until an ignition of the motor vehicle is engaged.

\* \* \* \* \*